3,017,374
PRINTING INKS
Dominic J. Bernardi, Scarsdale, Alfred M. Tringali, Bayside, and Howard T. Roth, Ridgewood, N.Y., and Loy S. Engle, Harrington Park, N.J., assignors to Interchemical Corporation, New York, N.Y., a corporation of Ohio
No Drawing. Filed Mar. 29, 1956, Ser. No. 574,587
4 Claims. (Cl. 260—18)

This invention is concerned with typographic printing inks of the type which set by moisture precipitation, and aims to provide inks of this general type which are characterized by improved rub resistance on many types of stock, as compared with standard moisture precipitation inks, and by improved alkali resistance.

In the field of package printing, typographic inks which set by moisture precipitation have come into extensive use. Such inks are characteristically based on vehicle comprising solutions of hard resins in water-miscible high boiling glycol solvents (e.g.-diethylene glycol, dipropylene glycol and higher glycols). By the proper choice of resin, solvent and additives, it is possible to get inks which are printable under ordinary ambient conditions, but which after printing absorb water (from the air, from the stock, or from drying apparatus which supplies water) so that the resin is precipitated, allowing the mixture of water and solvent to be absorbed by the stock. Fast drying, excellent appearance, and the lack of odor attainable with these inks has been largely responsible for their acceptance by printers of packages and packaging materials.

Because of the requirement that the resin be soluble in glycol solvents, be press stable under ambient conditions (which often involves high humidity) and be precipitable from solution by the addition of water to the printed film, the available resins have been so limited that optimum film properties are not always available in the finished prints. Originally, rub-resistance, both wet and dry, was a major problem with inks of this type; and the first large use of these inks was in fields where the ink was protected by a wax film (e.g. bread wrappers) and in fields where rub-resistance was no problem. However, additives to improve rub-resistance have been developed so that inks of this type are comparable, at least in dry rub-resistance, with the best drying oil inks on many stocks (e.g.-kraft board, white patent coated and clay coated boards). However, they are not satisfactory on other stocks (e.g.-potlach board) for dry rub-resistance, and have rather poor wet rub-resistance. In addition, they have poor alkali resistance.

According to the present invention, we produce moisture setting inks of superior rub and alkali resistance to conventional moisture setting inks, by using as the basic vehicles of our inks solutions, in glycol solvents, of solid resinous esters made from oil fatty acids and solid polymeric polyhydric alcohols having alternating aliphatic chains and aromatic nuclei united through ether oxygens, and containing terminal epoxide groups and one or more alcoholic hydroxide groups per molecule and having a melting point (Durran mercury) from about 60 to 135° C., using at least one mol of oil fatty acid per mol of polymeric alcohol, up to the amount of fatty acid at which the ester becomes insoluble in glycols. Preferably the acids used are drying oil acids, and we use about two mols of acids per mol of polymeric alcohol—i.e.—one fatty acid per possible epoxide group. Inks are compounded from these vehicles in conventional fashion, using conventional pigments, waxes, etc.

The solid polymeric epoxy-hydroxy alcohols we prefer to employ are those made by reacting dihydroxy diphenyl dimethyl methane, especially 4-4′ dihydroxy diphenyl dimethyl methane or commercial mixtures of this 4-4′ isomer with lesser quantities of 2-2′ and 4-2′ isomers ("Bisphenol A") with epichlorhydrin. These materials are available commercially under the trade name "Epon." The polymers are believed to comprise alternate aliphatic chains, derived from epichlorhydrin, and aromatic nuclei derived from bisphenol, connected by either oxygens; the terminal aliphatic chains contain either an epoxide group or a hydrolyzed epoxide group, each interior aliphatic chain an aliphatic hydroxyl. On reaction with fatty acids, the epoxide groups react to form esters, on one of the carbons of the epoxide group, and a hydroxyl on the other carbon; when the epoxides are opened up, then the original and the newly formed primary hydroxyls will react.

In order to get the desired film properties, it is necessary to use a polymeric epoxy alcohol which has a melting point of at least 60° C. by the Durran mercury method—this corresponds to a chain length of about three hydroxyls plus the terminal epoxy groups (commercially "Epon 1001"). As the chain length goes up toughness of the films increases, but the solubility of the products in glycols goes down, so that we cannot use polymeric epoxy alcohols having melting points above 135° C.—this corresponds to a chain length of about 12 hydroxyls plus the terminal epoxy groups.

Sufficient fatty acid should be used to open up one of the terminal epoxy groups (mol per mol) and preferably we use approximately two mols of fatty acid, sufficient to esterify the terminal hydroxyls. As the amount of fatty acid increases, solubility in the glycols decreases, and rub-resistance improves. The maximum amount we have been able to use is 50% fatty acid to 50% alcohol, with the alcohol of the lowest chain length (Epon 1001) as against a 36:64 ratio necessary to react with the terminal groups; but at this higher oil content, the varnishes lack press stability. Maximum oil content for solubility diminishes slightly as the molecular weight of the Epon increases.

It is desirable not to completely esterify the oil fatty acids in the reaction; a small amount of free acid improves press stability of the ink. We prefer to use esters with acid numbers of the order of 20 to 30, to insure optimum press stability under conditions of relatively high humidities. However, esters of lower acidity can be used if ambient conditions are controlled to insure low humidity.

We have used, as the oil fatty acids, tung, linseed, oiticica and dehydrated castor oil among the drying oil fatty acids, soya acids and the segregated fatty acids from tall oil among the semidrying oil acids, and ricinoleic and coconut fatty acids among the non drying oil acids. All of the inks set by precipitation, regardless of the acid employed, and when properly formulated give excellent dry rub-resistance—apparently it is the physical nature of the material which is responsible. The drying oil esters, moreover, toughen up somewhat with time, and an improvement in alkali resistance is obtained, particularly with the esters of such acids as have conjugated double bonds.

We may use any of the solvents commonly used in moisture setting inks—e.g.—the liquid water miscible glycols and polyglycols which are sufficiently non volatile to be press stable, and sufficiently hygroscopic to pick up water to precipitate the resin. Of the simple glycols, hexylene glycol represents the lowest one which is press stable. Diethylene glycol, triethylene glycol, dipropylene glycol, and tripropylene glycol represent preferred solvents, although the polyethylene glycols are poorer solvents for our esters than the polypropylene glycols, and tend to be less press stable.

Typical examples of our invention are the following.

*Example 1.—64% Epon 1001; 36% tung fatty acid*

| | Gms. |
|---|---|
| Epon 1001 | 1728 |
| Tung fatty acid | 972 |

Ingredients are weighed into a 3 neck, 5 liter flask equipped with agitator, thermometer and $CO_2$ influx tube and heated to 150–155° C. in 1½ hours. This temperature is maintained until an acid value of 30–35 is reached, usually a 3 hour period. The ester is dissolved in dipropylene glycol to a total non volatile of 65% and has a viscosity at 30° C. of 104–105 poises.

*Example 2.—64% Epon 1004; 36% linseed fatty acid*

| | Gms. |
|---|---|
| Epon 1004 | 800 |
| Linseed fatty acid | 450 |

Heated to a temperature of 175–190° C. in 1½ hours and maintained at temperature until an acid value of 25–30 is reached, usually 1½ hours. The ester is dissolved in dipropylene glycol to a total non volatile of 65% and has a viscosity of 204–207 poises.

*Example 3.—64% Epon 1001; 36% ricinoleic acid*

| | Gms. |
|---|---|
| Epon 1001 | 2048 |
| Ricinoleic acid | 1152 |

Heated to a temperature of 150–155° in 1½ hours and maintained at temperature until an acid value of 25–30 was reached, usually 2 hours. The ester is dissolved in dipropylene glycol to a total non volatile of 70% and has a viscosity at 30° C. of 255–260 poises.

We have reproduced the above and other vehicles with other glycol solvents, including hexylene glycol, diethylene glycol, tripropylene glycol and the like, with other oil fatty acids, and with other ratios of oil fatty acids, in the ranges indicated above.

*Example 4*

| | Lbs. |
|---|---|
| Magnesia | 1.000 |
| Vehicle of Example 1 | 36.500 |
| Barium lithol | 6.450 |
| Wax compound, 150 vehicle, 51 hexylene glycol, 99 amber wax (petroleum wax) | 5.000 |
| 6% cobalt octasol | 1.500 |
| Hexylene glycol | 1.000 |
| 95% eugenol (anti-oxidant) | .150 |

*Example 5.—Red ink with varnish of Example 1*

| | |
|---|---|
| Titanium dioxide | .900 |
| Calcium lithol | .800 |
| Molybdated chrome orange | 1.300 |
| Cobalt drier | .200 |
| Amber wax | .300 |
| Varnish of Example 1 | 5.700 |
| Dipropylene glycol | 1.200 |

*Example 6.—Blue ink using varnish of Example 2*

| | |
|---|---|
| Varnish of Example 2 | 36.500 |
| Hydrite white (clay) | 3.000 |
| 6% cobalt octasol liquid | 1.500 |
| Iron blue | 5.000 |
| Phthalocyanine blue | 3.000 |
| Wax compound (see Example 4) | 5.000 |
| Hexylene glycol | 1.000 |
| Eugenol | .150 |

*Example 7.—Red ink using varnish of Example 3*

| | |
|---|---|
| Vehicle of Example 3 | 27.700 |
| Microcrystalline wax compound | 6.700 |
| Dipropylene glycol | 4.200 |
| Lithol rubine | 2.100 |
| Red lake C | 9.700 |
| Titanium dioxide | 3.100 |

While we have shown but a few examples of our invention, it is obvious that the examples can be multiplied indefinitely without departing from the scope of our invention as defined in the claims. The inks can be made with all the common pigments, fillers, waxes and other addants conventionally used. The esters shown can be varied as described to include all oil fatty acid esters of the disclosed solid resinous polymeric epoxided polyalcohols, in the indicated ranges.

We claim:

1. A moisture setting printing ink of improved rub-resistance comprising waxy material and solid coloring matter in a vehicle comprising a solution of a resinous ester of (1) an oil fatty acid having at least 12 carbon atoms with (2) a polymeric solid resinous epoxidized polyhydric alcohol with a melting point between 60 and 135° C. and a 1,2-epoxy equivalency greater than 1.0 and obtained by reacting epichlorohydrin and dihydroxy diphenyl dimethyl methane, there being at least one mol of oil fatty acid in the ester per mole of polymeric alcohol, but insufficient to render the ester insoluble in the solvent which constitutes at least 30 percent by weight of the vehicle and consists of a press stable water-soluble hygroscopic glycol selected from the group consisting of alkane diols having six or more carbon atoms and glycols having alkylene groups interrupted by ether linkages.

2. A moisture setting printing ink as claimed in claim 1, wherein the said resinous ester contains about two mols of oil fatty acid per mol of polymeric solid resinous epoxidized polyhydric alcohol.

3. A moisture setting printing ink as claimed in claim 1, wherein the oil fatty acid is derived from a drying oil and has conjugated double bonds, whereby the ink has improved alkali resistance as well as improved rub-resistance.

4. A moisture setting printing ink as claimed in claim 1, wherein the resin contains a small amount of free acid, whereby it has an acid number of the order of 20 to 30.

References Cited in the file of this patent

UNITED STATES PATENTS

| 2,436,954 | Denton | Mar. 2, 1948 |
| 2,500,765 | Montague | Mar. 14, 1950 |
| 2,637,621 | Auer | May 5, 1953 |
| 2,653,142 | Cody | Sept. 22, 1953 |
| 2,728,744 | May et al. | Dec. 27, 1955 |
| 2,728,781 | Shokal | Dec. 27, 1955 |
| 2,754,277 | McNabb | July 10, 1956 |

FOREIGN PATENTS

| 139,374 | Australia | Dec. 24, 1947 |